Aug. 30, 1932.   A. CALBERG ET AL   1,874,894
AIR AND GAS MIXING DEVICE FOR INTERNAL COMBUSTION ENGINES
Filed June 23, 1931   2 Sheets-Sheet 1
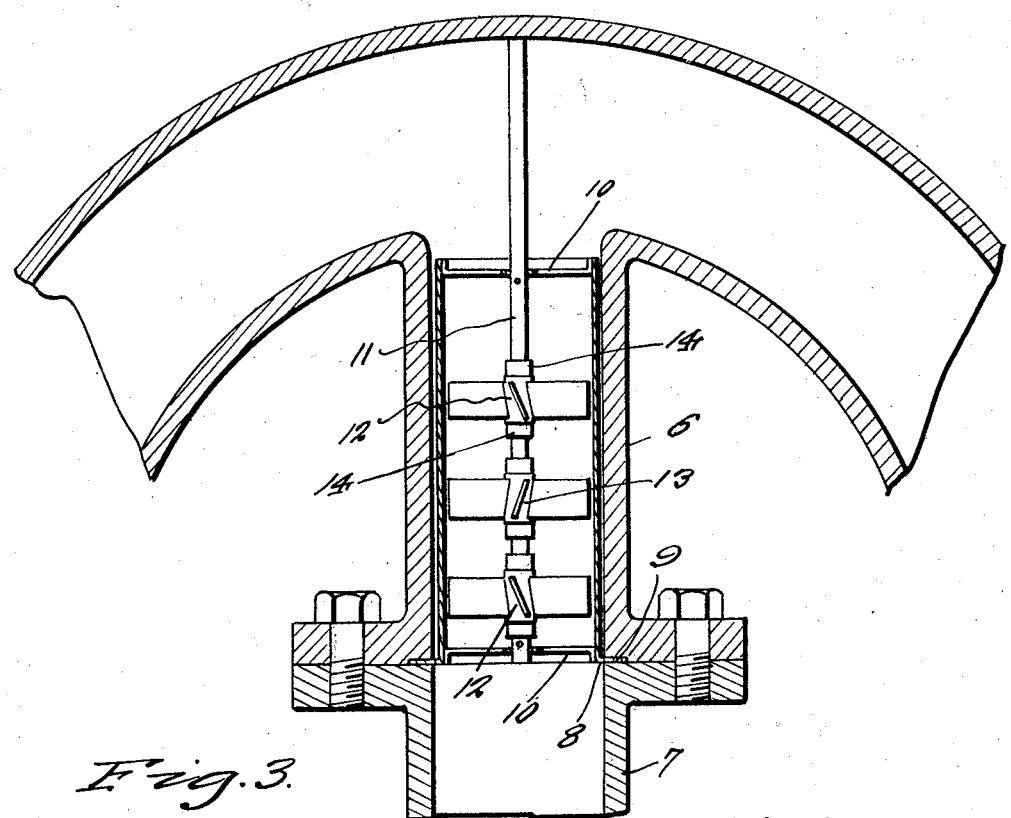
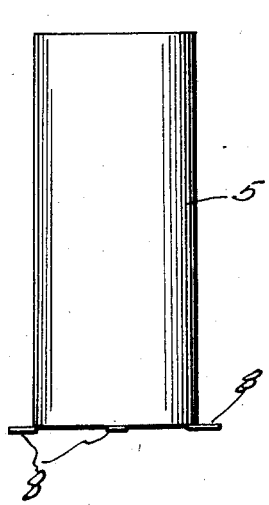
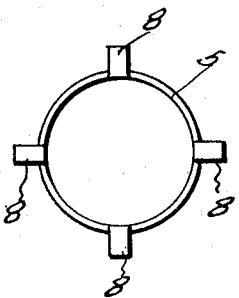
Inventor
Anton Calberg
Hermann K. Prinz
By  Clarence A. O'Brien
Attorney Aug. 30, 1932.  A. CALBERG ET AL  1,874,894
AIR AND GAS MIXING DEVICE FOR INTERNAL COMBUSTION ENGINES
Filed June 23, 1931   2 Sheets-Sheet 2
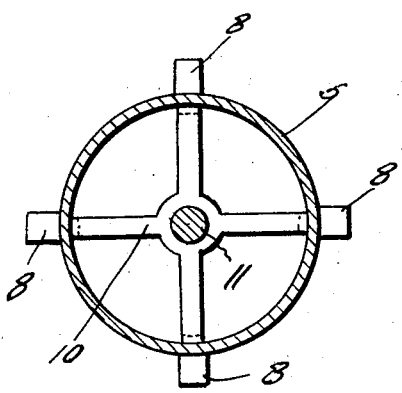
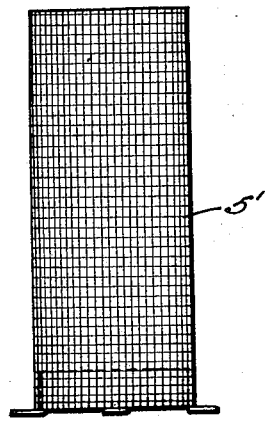
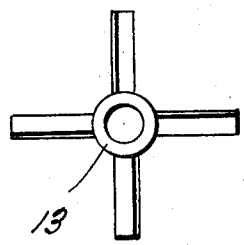
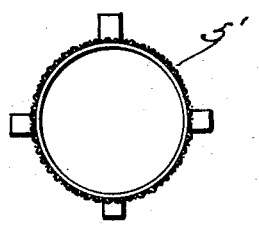
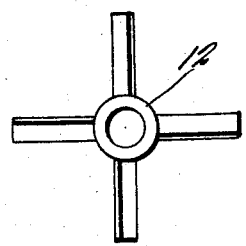
Inventor
Anton Calberg
Hermann K Prinz
By Clarence AOBrien
Attorney Patented Aug. 30, 1932

1,874,894

UNITED STATES PATENT OFFICE

ANTON CALBERG, OF CRANFORD, AND HERMANN K. PRINZ, OF LINDEN, NEW JERSEY

AIR AND GAS MIXING DEVICE FOR INTERNAL COMBUSTION ENGINES

Application filed June 23, 1931. Serial No. 546,392.

This invention relates to a device for mixing air and gas prior to the feeding of the mixture to the combustion chambers of an internal combustion engine, and has as its primary object to subject the air and gas to a whirling motion for thoroughly mixing the same.

A still further object of the invention is to provide a device of the character above mentioned which may be mounted in the manifold of the internal combustion engine at the intake side thereof and directly above the butterfly valve of the carbureter.

Other objects and advantages of the invention will be apparent from a study of the following description, taken in connection with the accompanying drawings wherein:

Figure 1 is a vertical sectional elevational view taken through the device, the same being shown as mounted in the intake manifold of an internal combustion engine.

Figure 2 is a transverse sectional elevational view taken through the device adjacent one end thereof.

Figure 3 is an elevational view of a casing forming part of the invention.

Figure 4 is a bottom plan view of the casing.

Figure 5 is a top plan view of one of the propellers.

Figure 6 is a side elevational view thereof.

Figure 7 is a top plan view of another of the propellers.

Figure 8 is a side elevational view thereof.

Figure 9 is an elevational view of a modified form of propeller casing.

Figure 10 is a transverse sectional view therethrough.

With reference more in detail to the drawings, it will be seen that the device comprises a cylindrical casing, which, as shown in Figure 3, designated by the reference character 5, is preferably formed of metal, to be used under ordinary conditions, or in lieu thereof there may be employed the casing 5' shown in Figure 9 and formed of wire screen mesh, this latter form of casing being for use where there is a suction intake in the manifold, and which is located in the vicinity where the device is placed, such suction intake being used for vacuum tank.

In Figure 1 I have shown the device employing the casing 5, wherein it will be seen that the same is located within the flange 6 of an intake manifold, a portion of which is shown in said figure. The tube 5 is located in longitudinal alinement with the outlet end 7 of the carbureter, a portion of which is also shown in Figure 1. Thus it will be seen that the casing will be located above the butterfly valve of the carbureter. The casing is opened at each end thereof, and at the lower end is provided with an annular series of spaced radial tongues or flanges 8 received in notches 9 provided in the coupling flange of the manifold 6 at the joint between the manifold and carbureter. (See Figure 1).

Arranged at the upper and lower end of the casing 5, is a spider 10, the hub of which forms a bearing for accommodating a portion of a fan shaft 11 that extends vertically and longitudinally to the casing 5, and which at its upper end contacts the upper wall of the intake manifold.

Mounted on the shaft 11 for rotation relative thereto, and located within the casing 5, are a plurality of vertically spaced fan or propellers 12 and 13, each of which comprises a hub having a plurality, preferably four blades radiating therefrom. The hub of each propeller is rotatably confined between upper and lower collars 14 keyed to the shaft 11.

Preferably three propellers are used, including upper and lower propellers 12 and an intermediate propeller 13. The blades of the propeller 13 are pitched oppositely to the pitch of the blades of the propellers 12 so that, propellers 12 being adapted to rotate in a clockwise direction, propeller 13 will rotate in an opposite or counterclockwise direction.

In operation, with the parts located in Figure 1, it will be seen that during operation of the motor, the suction of the motor will cause the propellers to rotate and the mixture of air and fuel being drawn from the carbureter through the intake manifold will be subjected to the action of the propellers, and the resultant whirling motion of the mixture will cause a thorough mixing of the air and gas.

In employing three propellers, it will be seen that consecutive propellers or fans rotate in opposite directions, thus insuring a thorough mixing of the air and gas fumes drawn from the carbureter. Further, the device being operable by suction requires no manual control, and is automatic in operation providing at all times for a supply of the fuel in a thoroughly mixed state.

Even though I have herein shown and described the preferred embodiment of the invention, it is to be understood that the same is susceptible of further changes, modifications and improvements coming within the scope of the appended claim.

Having thus described my invention, what I claim as new is:

A mixing device of the kind described comprising a cylinder open at its ends and adapted for disposition within the inlet pipe of an intake manifold, a spider mounted in the cylinder at each end of the latter, a shaft supported by said spiders and having an upper end extending into the intake manifold and engaged with the top wall of said manifold, three vertically spaced propellers rotatably mounted on said shaft, the uppermost propeller being disposed a material distance inwardly from the upper end of said cylinder; and said cylinder at its lower end being provided with a circular series of spaced ears adapted to be clamped between the confronting flanges of a carbureter outlet pipe and the said inlet pipe of the manifold.

In testimony whereof we affix our signatures.

ANTON CALBERG.
HERMANN K. PRINZ.